United States Patent
Qiu et al.

(10) Patent No.: US 11,162,417 B2
(45) Date of Patent: Nov. 2, 2021

(54) SCOOP INLET

(71) Applicant: General Electric Company, Schenectady, NY (US)

(72) Inventors: Liangjun Qiu, Shanghai (CN); Guohua Zhong, Shanghai (CN)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 16/419,499

(22) Filed: May 22, 2019

(65) Prior Publication Data

US 2019/0360398 A1 Nov. 28, 2019

(51) Int. Cl.
| | |
|---|---|
| *F02C 6/08* | (2006.01) |
| *F02C 7/04* | (2006.01) |
| *F02C 7/18* | (2006.01) |
| *F02C 3/06* | (2006.01) |

(52) U.S. Cl.
CPC ............ *F02C 7/04* (2013.01); *F02C 3/06* (2013.01); *F02C 7/18* (2013.01); *F02C 6/08* (2013.01); *F02C 7/185* (2013.01)

(58) Field of Classification Search
CPC .... F02C 6/08; F02C 7/185; B64D 2013/0622; B64D 2033/0226
See application file for complete search history.

(56) References Cited

U.S. PATENT DOCUMENTS

| | | | |
|---|---|---|---|
| 2,348,253 A | 5/1944 | Griswold | |
| 4,002,024 A | 1/1977 | Nye et al. | |
| 4,254,618 A * | 3/1981 | Elovic | F28D 21/0014 60/226.1 |
| 4,674,704 A | 6/1987 | Altoz et al. | |
| 4,782,658 A | 11/1988 | Perry | |
| 5,092,425 A | 3/1992 | Shaw, Jr. | |
| 5,269,135 A | 12/1993 | Vermejan et al. | |
| 5,279,109 A | 1/1994 | Liu et al. | |
| 5,284,012 A | 2/1994 | Laborie et al. | |
| 5,340,054 A * | 8/1994 | Smith | B64C 23/06 244/1 N |
| 5,351,476 A | 10/1994 | Laborie et al. | |
| 5,611,197 A * | 3/1997 | Bunker | F02C 7/224 60/806 |

(Continued)

FOREIGN PATENT DOCUMENTS

| | | |
|---|---|---|
| JP | H01177446 A | 7/1989 |
| JP | 2010248980 A | 11/2010 |

*Primary Examiner* — Gerald L Sung
(74) *Attorney, Agent, or Firm* — Dority & Manning, P.A.

(57) ABSTRACT

A scoop inlet for a turbomachine. The turbomachine includes a core engine casing relative to a centerline extending the length of the turbomachine. Further, the core engine casing at least partially defines a bypass flow passage. The scoop inlet includes an inlet at the core engine casing in fluid communication with the bypass flow passage. The inlet includes a mouth fluidly coupling the bypass flow passage to a cooling system. The mouth receives bypass bleed air from the bypass flow passage and defines a width in a circumferential direction relative to the centerline. The scoop inlet also includes a bypass bleed duct defined through the core engine casing. The bypass bleed duct fluidly couples the mouth to the cooling system. In addition, the scoop inlet includes a plurality of droplets at the mouth of the inlet partially extending from the mouth into the bypass flow passage.

23 Claims, 10 Drawing Sheets

(56) References Cited

U.S. PATENT DOCUMENTS

| | | | |
|---|---|---|---|
| 5,655,359 A | 8/1997 | Campbell et al. | |
| 5,699,981 A * | 12/1997 | McGrath | B64C 23/005 |
| | | | 244/1 N |
| 6,050,527 A * | 4/2000 | Hebert | B64D 33/02 |
| | | | 244/210 |
| 6,098,925 A * | 8/2000 | Burdsall, II | B64C 23/06 |
| | | | 244/118.1 |
| 6,264,137 B1 | 7/2001 | Sheoran | |
| 6,264,138 B1 | 7/2001 | Hawkins | |
| 6,375,118 B1 * | 4/2002 | Kibens | F02K 1/827 |
| | | | 244/53 R |
| 6,438,941 B1 * | 8/2002 | Elliott | F01D 17/105 |
| | | | 60/226.1 |
| 7,200,999 B2 | 4/2007 | Bagnall et al. | |
| 7,607,308 B2 | 10/2009 | Kraft et al. | |
| 7,798,448 B2 * | 9/2010 | Bilanin | B64C 23/005 |
| | | | 244/130 |
| 7,966,831 B2 | 6/2011 | Kraft et al. | |
| 8,024,935 B2 | 9/2011 | Hoover et al. | |
| 8,408,008 B2 | 4/2013 | Todorovic et al. | |
| 8,721,406 B2 | 5/2014 | Kastell et al. | |
| 8,726,673 B2 | 5/2014 | Peters et al. | |
| 9,045,998 B2 | 6/2015 | Lo et al. | |
| 9,108,737 B2 | 8/2015 | Zysman | |
| 9,127,103 B2 * | 9/2015 | Seo | C08F 222/10 |
| 9,194,330 B2 | 11/2015 | Wood et al. | |
| 9,463,754 B2 * | 10/2016 | Patience | B64C 23/005 |
| 10,487,744 B2 * | 11/2019 | Post | B64D 33/00 |
| 10,518,605 B2 * | 12/2019 | Molin | F02K 1/827 |
| 10,544,737 B2 * | 1/2020 | Bowden | F02K 3/06 |
| 2008/0230651 A1 * | 9/2008 | Porte | F02C 7/14 |
| | | | 244/118.5 |
| 2010/0126182 A1 | 5/2010 | Hoover et al. | |
| 2013/0175001 A1 * | 7/2013 | Cheong | F02K 3/115 |
| | | | 165/41 |
| 2015/0114481 A1 | 4/2015 | Willie et al. | |
| 2016/0031290 A1 * | 2/2016 | Molin | B64D 33/02 |
| | | | 165/44 |
| 2017/0122213 A1 | 5/2017 | Bowden et al. | |
| 2017/0335771 A1 * | 11/2017 | Post | F01D 25/24 |
| 2018/0016017 A1 * | 1/2018 | daSilva | F02C 6/08 |

\* cited by examiner

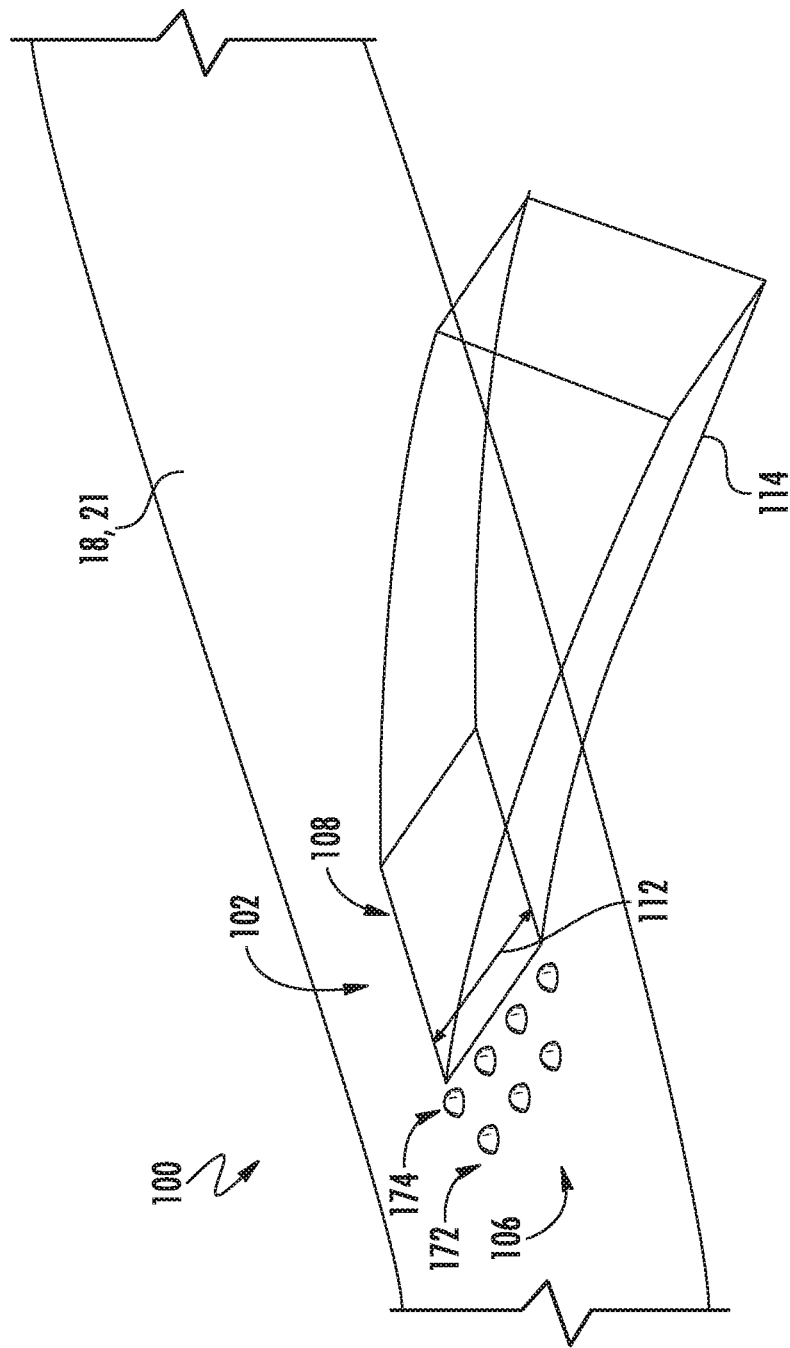

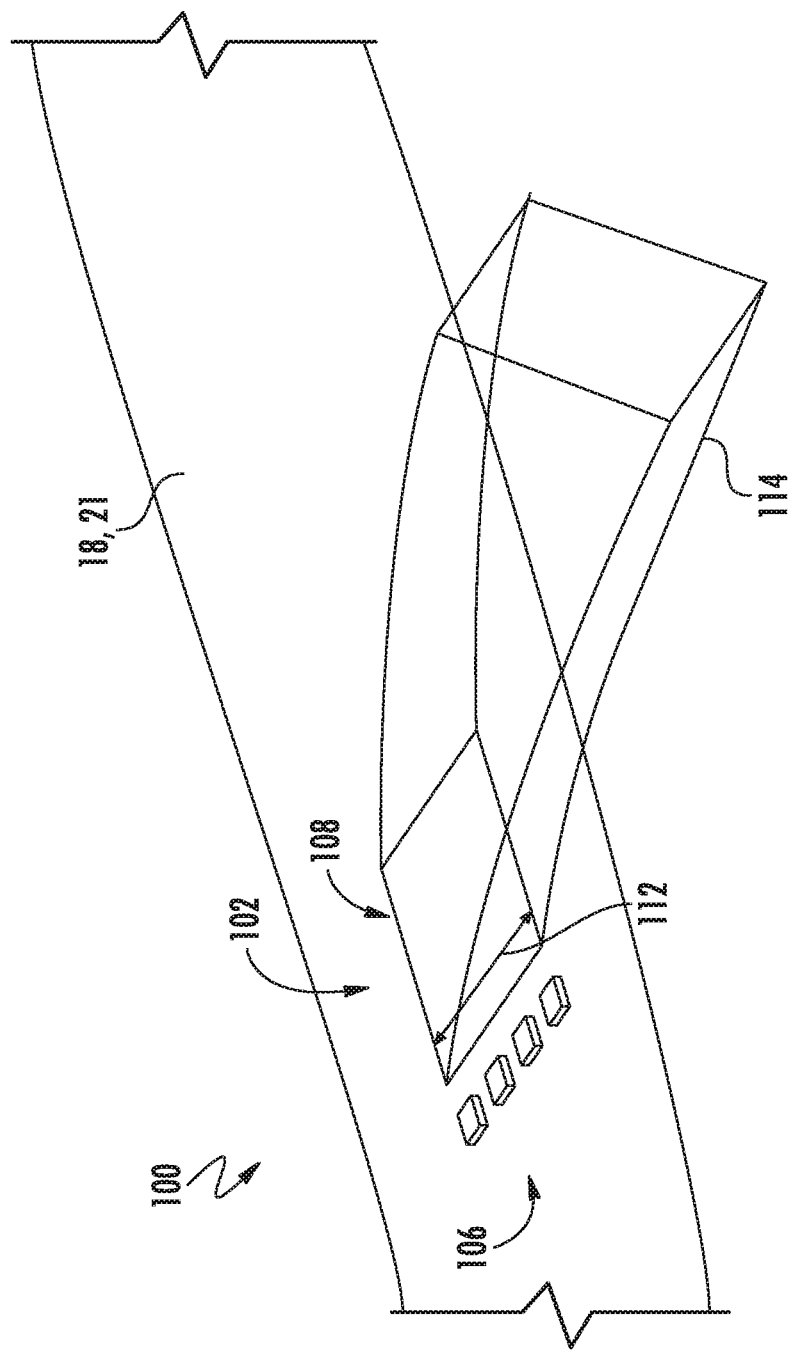

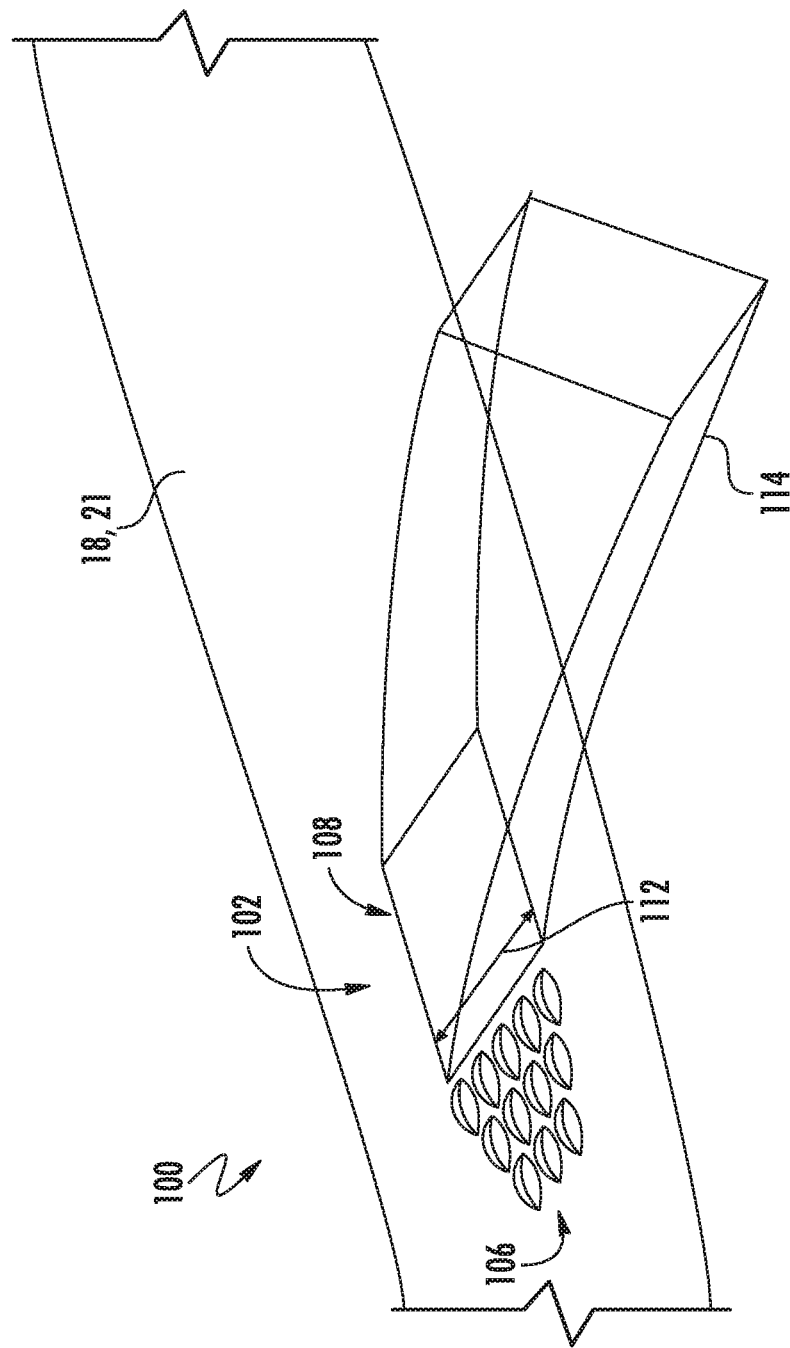

SCOOP INLET

FIELD

The present subject matter relates generally to a scoop inlet for a turbomachine, or, more particularly, a scoop inlet that includes a plurality of droplets at a mouth of the scoop inlet.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Gas turbine engines generally include an aircraft air management system for bleeding pressurized air from the compressor section and/or turbine section. Such pressurized air may be used for auxiliary purposes such as cooling or supplying pneumatic power to the aircraft. Pressurized air from the compressor section and/or turbine section may require additional cooling before being used for such auxiliary purposes. Relatively cooler air from the fan section or a bypass flow path may be used to cool the pressurized air. As such, a scoop inlet may be positioned in the fan section and/or the bypass flow path to bleed the cooler air and direct it to the air management system.

Gas turbine engines may also include a fan air valve to selectively open or close the supply of cooler air as necessary. For example, the fan air valve may be fully opened during hot conditions when the air management system needs cooling air and closed at cold conditions. When the fan air valve is in a closed position, a resonance chamber may be formed at the scoop inlet. For example, a Helmholtz resonance may be created by the airflow across the closed scoop inlet in the fan section and/or the bypass flow path. Such resonance may increase the noise of the turbomachine, create undesirable vibrations, impact performance, and damage hardware.

Therefore, a need exists for an improved scoop inlet.

BRIEF DESCRIPTION

Aspects and advantages will be set forth in part in the following description, or may be obvious from the description, or may be learned through practice of the invention.

In one aspect, the present disclosure is directed to a scoop inlet for a turbomachine. The turbomachine includes a core engine casing relative to a centerline extending the length of the turbomachine. Further, the core engine casing at least partially defines a bypass flow passage. The scoop inlet includes an inlet at the core engine casing in fluid communication with the bypass flow passage. The inlet includes a mouth fluidly coupling the bypass flow passage to a cooling system. The mouth receives bypass bleed air from the bypass flow passage and defines a width in a circumferential direction relative to the centerline. The scoop inlet also includes a bypass bleed duct defined through the core engine casing. The bypass bleed duct fluidly couples the mouth to the cooling system. In addition, the scoop inlet includes a plurality of droplets at the mouth of the inlet partially extending from the mouth into the bypass flow passage.

In one embodiment, the droplets may be arranged approximately in a row in the circumferential direction. In such embodiments, the droplets may define a plurality of spaces extending between the droplets in the circumferential direction. In addition, the spaces may be approximately 0.05 to 0.2 of the width of the mouth. In another embodiment, the droplets may define a droplet width approximately 0.1 to 0.4 of the width of the mouth. In alternative embodiments, the droplets may define a length in an axial direction relative to the centerline. Further, the length may be approximately 0.15 to 0.45 of the width of the mouth. In a still further embodiment, a height of the droplets in a radial direction relative to the centerline may be approximately 1 to 2 times a local thickness of a boundary layer of a bypass fluid traveling through the bypass flow passage. In another embodiment, the plurality of droplets may include five droplets arranged in a row at the mouth in the circumferential direction. In a further embodiment, the plurality of droplets may include at least two droplets but less than eight droplets.

In one embodiment, the scoop inlet may further include a fan air valve in fluid communication with the bypass bleed duct. The fan air valve may selectively allow fluid communication between the bypass bleed duct and the cooling system. In another embodiment, the inlet may be positioned at a fan section of the turbomachine.

In another aspect, the present disclosure is directed to a turbomachine defining a centerline extending the length of the turbomachine. The turbomachine includes a nacelle extending a length of the turbomachine relative to the centerline. Further, the nacelle at least partially defines a bypass flow passage. The turbomachine also includes a core engine having a core engine casing positioned interior to the nacelle in a radial direction relative to the centerline. In addition, the core engine casing at least partially defines the bypass flow passage. The turbomachine further includes a cooling system positioned at least partially interior to the core engine casing relative to the radial direction.

The turbomachine also includes a scoop inlet in fluid communication with the bypass flow passage. The scoop inlet includes an inlet at the core engine casing or an interior surface of the nacelle in fluid communication with the bypass flow passage. The inlet includes a mouth fluidly coupling the bypass flow passage to the cooling system. The mouth receives bypass bleed air from the bypass flow passage and defines a width in a circumferential direction relative to the centerline. The scoop inlet also includes a bypass bleed duct defined through at least one of the core engine casing or the nacelle. The bypass bleed duct fluidly couples the mouth to the cooling system. In addition, the scoop inlet includes a plurality of droplets at the mouth of the inlet partially extending from the mouth into the bypass flow passage. In one embodiment, the inlet is positioned at the core engine casing. In another embodiment, the inlet is positioned at the interior surface of the nacelle.

In one embodiment, the scoop inlet may further include a fan air valve in fluid communication with the bypass bleed duct. Further, the fan air valve may selectively allow fluid communication between the bypass bleed duct and the cooling system. In another embodiment, the cooling system may be in fluid communication with a compressor bleed port. In such embodiments, the cooling system may include a precooler in fluid communication with the bypass bleed duct and the compressor bleed port. In addition, the precooler may include a heat exchanger to thermally couple the bypass bleed air with a compressor bleed air supplied by the compressor bleed port. In a further embodiment, the cooling system may be in fluid communication with a turbine bleed port. In such embodiments, the cooling system may include a precooler in fluid communication with the bypass bleed duct and the turbine bleed port. In addition, the precooler may include a heat exchanger to thermally couple the bypass bleed air with a turbine bleed air supplied by the turbine bleed port.

In another embodiment, the cooling system may be in fluid communication with a compressor bleed port and a turbine bleed port. Further, the cooling system may include a precooler in fluid communication with the bypass bleed duct, the compressor bleed port, and the turbine bleed port. The precooler may include a heat exchanger to thermally couple the bypass bleed air with at least one of a turbine bleed air supplied by the turbine bleed port or a compressor bleed air supplied by the compressor bleed port. It should be further understood that the turbomachine may further include any of the additional features as described herein.

In another aspect, the present disclosure is directed to a scoop inlet for a turbomachine. The turbomachine includes a nacelle relative to a centerline extending the length of the turbomachine. Further, the nacelle at least partially defines a bypass flow passage. The scoop inlet includes an inlet at the nacelle in fluid communication with the bypass flow passage. The inlet includes a mouth fluidly coupling the bypass flow passage to a cooling system. The mouth receives bypass bleed air from the bypass flow passage and defines a width in a circumferential direction relative to the centerline. The scoop inlet also includes a bypass bleed duct defined through the nacelle. The bypass bleed duct fluidly couples the mouth to the cooling system. In addition, the scoop inlet includes a plurality of droplets at the mouth of the inlet partially extending from the mouth into the bypass flow passage.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 10 is a view of another exemplary scoop inlet according to aspects of the present disclosure, particularly illustrating a scoop inlet with multiple rows of circular shaped droplets;

FIG. 11 is a view of another exemplary scoop inlet according to aspects of the present disclosure, particularly illustrating a scoop inlet with tab shaped droplets; and FIG. 12 is a view of another exemplary scoop inlet according to aspects of the present disclosure, particularly illustrating a scoop inlet with multiple rows of droplets.

Figure 1:
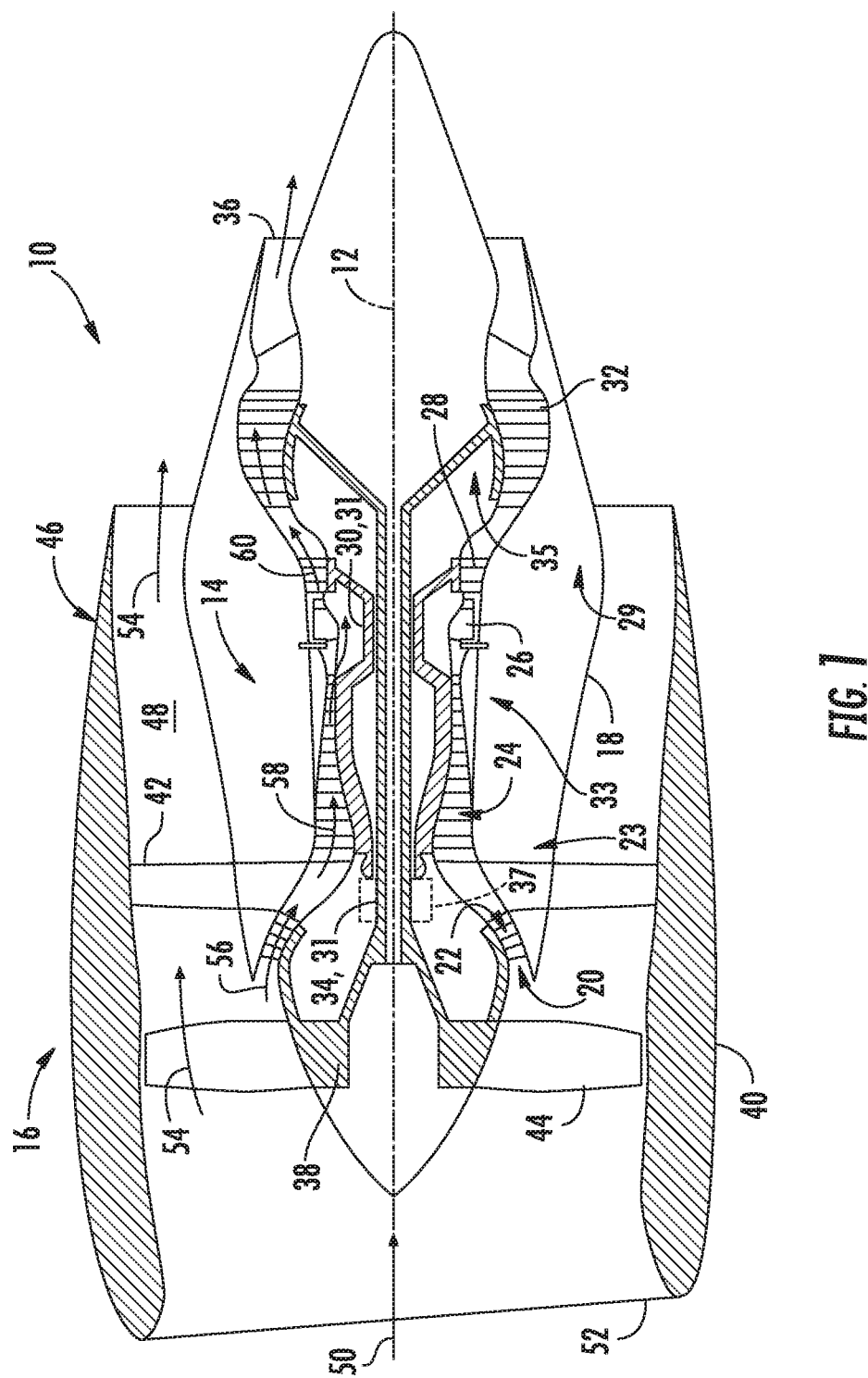
FIG. 1 is a cross-sectional view of one embodiment of a gas turbine engine that may be utilized within an aircraft in accordance with aspects of the present subject matter.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A fan duct scoop inlet is generally provided for a turbomachine. The inlet includes an inlet, a bypass bleed duct, and a plurality of droplets. For example, the scoop inlet may be on a core engine casing in fluid communication with a bypass flow passage. In one embodiment, the scoop inlet may avoid the formation of resonance when a fan air valve is closed so as to allow for a better performing scoop inlet. For example, a scoop inlet with a plurality of droplets at a mouth of the inlet may trigger vortices. Such vortices may break up the fluid flow at the closed scoop inlet and suppress the formation of a resonance chamber. Further, the formation of vortices or eddies at the mouth of the scoop inlet may break up a noise structure when acoustic resonance happens. As such, suppressing the formation of a resonance chamber may have advantageous effects on the noise of the turbomachine, reduce undesirable vibrations, improve performance, and/or prevent damage to hardware. Further, certain embodiments of the droplet design may solve resonance issues while having minor impact on overall engine/pylon weight. Still further, such droplets may be easily manufactured and installed and require relatively minor maintenance.

It should be appreciated that, although the present subject matter will generally be described herein with reference to a gas turbine engine, for example a turbofan engine, the disclosed systems and methods may generally be used within any suitable type of turbine engine, including aircraft-based turbine engines, land-based turbine engines, and/or steam turbine engines. For example, certain embodiments of the scoop inlet may be used within any turbomachine with a fan and/or bypass section.

Referring now to the drawings, FIG. 1 illustrates a cross-sectional view of one embodiment of a gas turbine engine 10 that may be utilized within an aircraft in accordance with aspects of the present subject matter, with the gas turbine engine 10 being shown having a longitudinal or axial centerline axis 12 extending therethrough for reference purposes. In general, the gas turbine engine 10 may include a core gas turbine engine (indicated generally by reference character 14) and a fan section 16 positioned upstream thereof. The core engine 14 may generally include a substantially tubular core engine casing 18 that defines an annular inlet 20. In addition, the core engine casing 18 may further enclose and support a compressor section 23. For the embodiment show, the compressor section 23 includes a booster compressor 22 and a high pressure compressor 24. The booster compressor 22 generally increases the pressure of the air (indicated by arrow 54) that enters the core engine 14 to a first pressure level. The high pressure compressor 24, such as a multi-stage, axial-flow compressor, may then receive the pressurized air (indicated by arrow 58) from the booster compressor 22 and further increase the pressure of such air. The pressurized air exiting the high pressure compressor 24 may then flow to a combustor 26 within which fuel is injected into the flow of pressurized air, with the resulting mixture being combusted within the combustor 26.

For the embodiment illustrated, the core engine casing 18 may enclose and support a turbine section 29. Further, for the depicted embodiment, the turbine section 29 includes a first high pressure turbine 28 and second low pressure turbine 32. For the illustrated embodiment, high energy combustion products 60 are directed from the combustor 26 along the hot gas path of the gas turbine engine 10 to the high pressure turbine 28 for driving the high pressure compressor 24 via a first, high pressure drive shaft 30. Subsequently, the combustion products 60 may be directed to the low pressure turbine 32 for driving the booster compressor 22 and fan section 16 via a second, low pressure drive shaft 34 generally coaxial with first drive shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the gas turbine engine 10 may generally include a rotatable, axial-flow fan rotor assembly 38 surrounded by an annular nacelle 40. It should be appreciated by those of ordinary skill in the art that the nacelle 40 may be supported relative to the core engine 14 by a plurality of substantially radially-extending, circumferentially-spaced outlet guide vanes 42. As such, the nacelle 40 may enclose the fan rotor assembly 38 and its corresponding fan rotor blades 44. Moreover, a downstream section 46 of the nacelle 40 may extend over an outer portion of the core engine 14 so as to define a bypass, or secondary, flow passage 48 providing additional propulsive jet thrust.

It should be appreciated that, in several embodiments, the low pressure drive shaft 34 may be directly coupled to the fan rotor assembly 38 to provide a direct-drive configuration. Alternatively, the low pressure drive shaft 34 may be coupled to the fan rotor assembly 38 via a speed reduction device 37 (e.g., a reduction gear or gearbox or a transmission) to provide an indirect-drive or geared drive configuration. Such a speed reduction device(s) 37 may also be provided between any other suitable shafts and/or spools within the gas turbine engine 10 as desired or required.

During operation of the gas turbine engine 10, it should be appreciated that an initial air flow (indicated by arrow 50) may enter the gas turbine engine 10 through an associated inlet 52 of the nacelle 40. For the illustrated embodiment, the air flow 50 then passes through the fan rotor blades 44 and splits into a first compressed air flow (indicated by arrow 54) that moves through bypass flow passage 48 and a second compressed air flow (indicated by arrow 56) which enters the booster compressor 22. In the depicted embodiment, the pressure of the second compressed air flow 56 is then increased and enters the high pressure compressor 24 (as indicated by arrow 58). After mixing with fuel and being combusted within the combustor 26, the combustion products 60 may exit the combustor 26 and flow through the high pressure turbine 28. Thereafter, for the shown embodiment, the combustion products 60 flow through the low pressure turbine 32 and exit the exhaust nozzle 36 to provide thrust for the gas turbine engine 10.

Still referring to FIG. 1, for the depicted embodiment, a rotating drive shaft 31 couples a turbine section 29 and a compressor section 23 of the turbomachine. In one embodiment, the rotating drive shaft 31 is the high pressure drive shaft 30 coupling the high pressure turbine 28 to the high pressure compressor 24. Together, the high pressure turbine 28, the high pressure compressor 24, and the high pressure drive shaft 30 may be referred to as a high pressure spool 33. In another embodiment, the rotating drive shaft 31 is the low pressure drive shaft 34 coupling the low pressure turbine 32 to a low pressure compressor, such as the booster compressor 22, and the fan section 16. Alternatively, the low pressure drive shaft 34 may couple the low pressure turbine 32 to the booster compressor 22 only or to the fan section 16 only. Together, the low pressure turbine 32, the low pressure drive shaft 34, and at least one of the booster compressor 22 or fan section 16 may be referred to as a low pressure spool 35. In a further embodiment (not shown), the rotating drive shaft 31 may be an intermediate pressure drive shaft coupling an intermediate compressor to an intermediate turbine. Together, the intermediate pressure drive shaft, intermediate pressure compressor, and intermediate pressure turbine may be referred to as an intermediate pressure spool.

Figure 2:
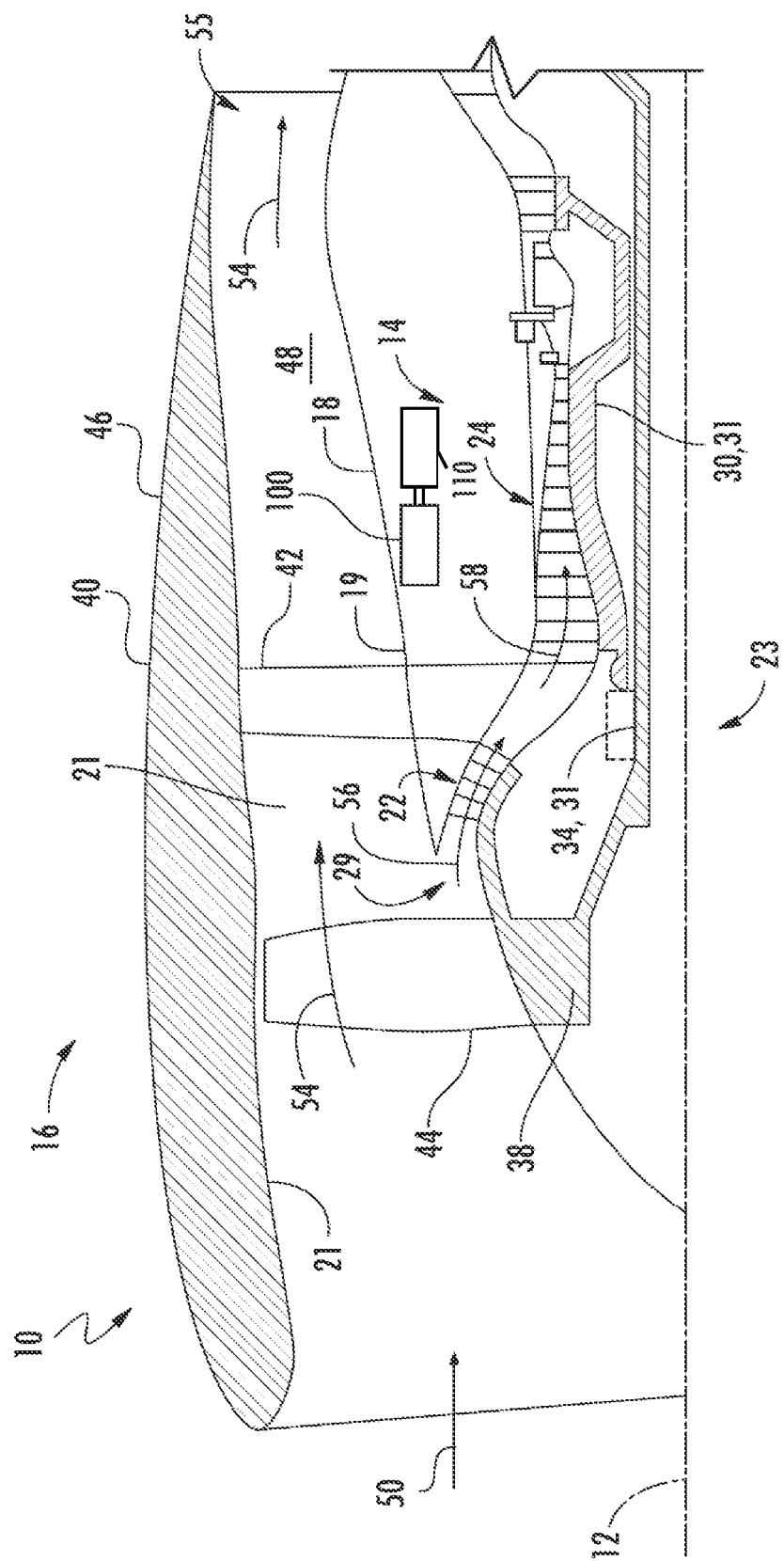
FIG. 2 is a closer view of the exemplary fan section and bypass flow passage of FIG. 1 illustrated according to aspects of the present subject matter.

Referring now to FIG. 2, a closer view of the fan section 16 and bypass flow passage 48 of FIG. 1 is illustrated according to aspects of the present disclosure. As described briefly in regards to FIG. 1, in one exemplary embodiment, a nacelle 40 may extend the length of the gas turbine engine 10 relative to the centerline 12. For example, the nacelle 40 may at least partially house a fan section 16 and a bypass flow passage 48. Further, for the exemplary embodiment, the nacelle 40 encases a core engine 14. A core engine casing 18 positioned interior to the nacelle 40 in a radial direction relative to the centerline 12 may at least partially house the core engine 14. For the illustrated embodiment, the core engine casing 18 at least partially defines the bypass flow passage 48. As such, it should be recognized that, for the depicted embodiment, the bypass flow passage 48 is at least partially defined by the nacelle 40 and the core engine casing 18. Further, the bypass flow passage 48 may extend from the fan section 16 to a bypass exhaust 55 at a downstream section 46 of the nacelle 40.

For the illustrated embodiment, the scoop inlet 100 is positioned on an exterior surface 19 of the of the core engine casing 18. Further, it should be recognized that the scoop inlet 100 may be positioned at any location on the core engine casing 18 aft of the fan rotor blades 44 relative to the centerline 12. In a further embodiment, the scoop inlet 100 may be positioned on an interior surface 21 of the nacelle 40. For example, the scoop inlet 100 may be positioned on the interior surface 21 of the nacelle 40 at any location aft of the fan rotor blades 44 relative to the centerline 12. As such, it should be recognized that the scoop inlet 100 may be positioned at the fan section 16 on either the interior surface 21 of the nacelle 40 or the exterior surface 19 of the core engine casing 18. Further, there may be a plurality of scoop inlets 100 positioned at the fan section 16, the bypass flow passage 48, or both on the interior surface 21, the exterior surface 19, or both.

Referring generally to FIGS. 3-9, various views of a scoop inlet 100 for a turbomachine are illustrated in accordance with aspects of the present subject matter. The scoop inlet 100 may be used generally in the gas turbine engine 10 of FIG. 1, but it should be recognized that the scoop inlet 100 may be used in any other suitable turbomachine. Further, though the scoop inlet 100 will be described in generally in reference to the gas turbine engine 10, such description is not limiting on the applicability of the scoop inlet 100 to other types of turbomachinery.

For the embodiments depicted, the turbomachine includes a core engine casing 18 relative to a centerline 12 extending the length of the turbomachine. Further, for the exemplary embodiments, the core engine casing 18 at least partially defines a bypass flow passage 48. In one embodiment, the scoop inlet 100 includes an inlet 102, a bypass bleed duct 114, and a plurality of droplets 106. The inlet 102 may be on the core engine casing 18 in fluid communication with the bypass flow passage 48. Further, for the illustrated embodiments, the inlet 102 includes a mouth 108 fluidly coupling the bypass flow passage 48 to a cooling system 110. The mouth 108 may receive bypass bleed air from the bypass flow passage 48. Further, for the shown embodiments, the mouth 108 defines a width 112 in a circumferential direction relative to the centerline 12. For the illustrated embodiments, a bypass bleed duct 114 is defined through the core engine casing 18. The bypass bleed duct 114 may fluidly couple the mouth 108 to the cooling system 110. For the exemplary embodiments, the plurality of droplets 106 is at the mouth 108 of the inlet 102. The droplets 106 may at least partially extend into a bypass fluid traveling through the bypass flow passage 48.

Figure 3:
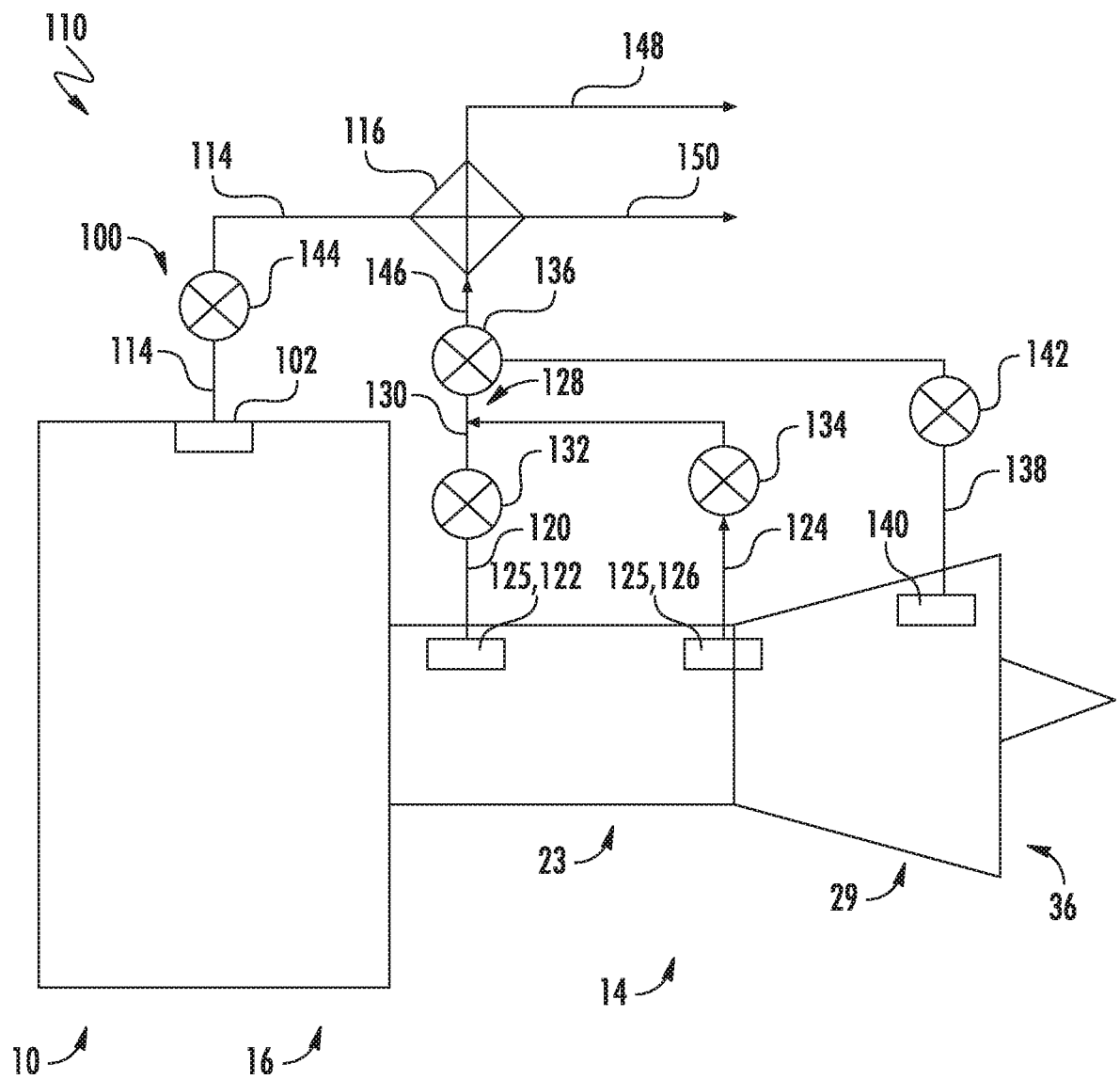
FIG. 3 is a schematic view of an exemplary cooling system including a precooler that may be utilized in the gas turbine engine of FIG. 1.

Referring now to FIG. 3, a schematic view of the cooling system 110 that may be utilized in the exemplary gas turbine engine 10 is illustrated according to aspects of the present disclosure. The gas turbine engine 10 may include a scoop inlet 100 in fluid communication with the bypass flow passage 48. The scoop inlet 100 may include a bypass bleed duct 114 defined through the core engine casing 18 or the nacelle 40 in fluid communication with the cooling system 110. For the embodiment depicted, the bypass bleed duct 114 fluidly couples the bypass flow passage 48 to the cooling system 110 of the gas turbine engine 10. Further, FIG. 3 shows a cooling system 110 including a precooler 116. It should be recognized that the cooling system 110 may generally be an air management system for utilizing pressurized bleed air for auxiliary purposes, such as cooling or supplying pneumatic power to an aircraft.

For the depicted embodiment, the cooling system 110 is positioned at least partially interior to the core engine casing 18 (see e.g., FIGS. 1-2) relative to the radial direction. For example, the cooling system 110 may be entirely housed within the core engine casing 18. In further embodiments, the cooling system 110 may be partially housed by the core engine casing 18 with components located in the bypass flow passage 48, the nacelle 40, or both.

For the illustrated embodiment, the cooling system 110 includes a low pressure compressor bleed duct (referred to as the low pressure duct 120). The low pressure duct 120 may fluidly couple a low pressure compressor bleed port 122 to the cooling system 110 such that the cooling system 110 is in fluid communication with the low pressure compressor bleed port 122. The low pressure compressor bleed port 122 may be located in the booster compressor 22 or an early stage of the high pressure compressor 24. For example, the low pressure compressor bleed port 122 may be located in a fourth stage of the high pressure compressor 24. For the exemplary embodiment, the cooling system 110 includes a low pressure valve 132 for selectively closing the low pressure duct 120. For example, a control system, such as a bleeding management control system (BMC) of the air management system, may communicate a signal to selectively open or close the low pressure valve 132. For instance, the low pressure valve 132 may be fully opened to supply a maximum amount of bleed air from the low pressure compressor bleed port 122. Further, the low pressure valve 132 may be fully closed or partially closed to fully or partially cut off the supply of bleed air from the low pressure compressor bleed port 122.

For the exemplary embodiment, the cooling system 110 includes a high pressure compressor bleed duct (referred to as the high pressure duct 124). The high pressure duct 124 may fluidly couple a high pressure compressor bleed port 126 to the cooling system 110 such that the cooling system 110 is in fluid communication with the high pressure compressor bleed port 126. The high pressure compressor bleed port 126 may be located in the high pressure compressor 24. For example, the high pressure compressor bleed port 126 may be located in a later stage of the high pressure compressor 24, such as the tenth stage. For the exemplary embodiment, the cooling system includes a high pressure valve 134 for selectively closing the high pressure duct 124. For example, the control system, such as the BMC, may communicate a signal to selectively open or close the high pressure valve 134. For instance, the high pressure valve 134 may be fully opened to supply a maximum amount of bleed air from the high pressure compressor bleed port 126. Further, the high pressure valve 134 may be fully closed or partially closed to fully or partially cut off the supply of bleed air from the high pressure compressor bleed port 126.

Further, for the exemplary embodiment, the high pressure duct 124 may meet the low pressure duct 120 at a joint 128. For example, either the low pressure valve 132 or the high pressure valve 134 may be selectively opened to allow for bleed air from the high pressure compressor bleed port 126 or air from the low pressure compressor bleed port 122, respectfully, to reach the joint 128. Further, for the embodiment shown, a compressor duct 130 may fluidly couple the low pressure duct 120, the high pressure duct 124, or both to a pressure regulating shut off valve (referred to as the shut off valve 136). For example, the compressor duct 130 may fluidly couple the joint 128 to the shut off valve 136. For the depicted embodiment, the shut off valve 136 may selectively open or close off the supply of pressurized air from the high pressure compressor bleed port 126 and/or the low pressure compressor bleed port 122. For example, the control system, such as the BMC, may communicate a signal to selectively open or close the shut off valve 136. Further, in certain operating conditions, it should be recognized that the low pressure valve 132 or the high pressure valve 134 may be fully or partially closed. In such a situation, air reaching the shut off valve 136 may come from one of the high pressure compressor bleed port 126 or the low pressure compressor bleed port 122.

In certain embodiments, the cooling system 110 may include only one compressor bleed port 125 in the compressor section 23. For example, the one compressor bleed port 125 may be the low pressure compressor bleed port 122. Contrarily, the one compressor bleed port 125 may be the high pressure compressor bleed port 126. Further, it should be recognized that the compressor bleed port 125 may be positioned anywhere in the compressor section 23, such as the booster compressor 22 or the high pressure compressor 24. As such, the cooling system 110 may be in fluid communication with the compressor bleed port 125 via the compressor duct 130. Further, the compressor duct 130 may include a valve, such as the low pressure valve 132 or the high pressure valve 134, to selectively open or close the supply of pressurized air from the compressor bleed port 125.

Still referring to FIG. 3, for the illustrated embodiments, the cooling system 110 includes a turbine bleed duct (referred to as the turbine duct 138). The turbine duct 138 may fluidly couple a turbine bleed port 140 to the cooling system 110 such that the cooling system 110 is in fluid communication with the turbine bleed port 140. The turbine bleed port 140 may be located in any stage of the turbine section 29 of the gas turbine engine 10. For example, the turbine bleed port 140 may be positioned in at least one of the high pressure turbine 28 or the low pressure turbine 32. For the exemplary embodiments, the cooling system 110 includes a turbine valve 142 for selectively closing the turbine duct 138. For example, the control system, such as the BMC, may communicate a signal to selectively open or close the turbine valve 142. For instance, the turbine valve 142 may be fully opened to supply a maximum amount of bleed air from the turbine bleed port 140. Further, the turbine valve 142 may be fully closed or partially closed to fully or partially cut off the supply of bleed air from the turbine bleed port 140.

Further, for the embodiment shown, the turbine duct 138 fluidly couples the turbine bleed port 140 to the shut off valve 136. For example, the control system, such as the BMC, may communicate a signal to selectively open or close the shut off valve 136 to supply pressurized air from the turbine bleed port 140. Further, it should be recognized that the shut off valve 136 may receive pressurized air from any of the low pressure compressor bleed port 122, the high pressure compressor bleed port 126, or the turbine bleed port 140 depending on whether the valve for each bleed port is opened, closed, or partially closed.

In other embodiments, the cooling system 110 may include fewer than all three bleed ports 122, 126, 140 described previously. For example, the cooling system 110 may only contain one compressor bleed port 125 and compressor duct 130. In another embodiment, the cooling system 110 may contain the high pressure compressor bleed port 126, the low pressure compressor bleed port 122, and the corresponding low pressure duct 120 and high pressure duct 124. Still, in a further embodiment, the cooling system 110 may only contain the turbine bleed port 140 and the corresponding turbine duct 138.

For the illustrated embodiment, the cooling system 110 is in fluid communication with the scoop inlet 100. For example, a bypass bleed duct 114 may fluidly couple the inlet 102 to the cooling system 110. For the depicted embodiments, a fan air valve 144 is in fluid communication with the bypass bleed duct 114. For example, the fan air valve 144 may selectively allow fluid communication between the bypass bleed duct 114 and the cooling system 110. For instance, the control system, such as the BMC, may communicate a signal to selectively open or close the fan air valve 144. Further, the fan air valve 144 may be partially closed to allow only a portion of bypass bleed air from the bypass flow passage 48 or fan section 16 to reach the cooling system 110. It should be recognized that in certain situations, the fan air valve 144 may be fully closed such that no air passes through the bypass bleed duct 114 and therefore the scoop inlet 100. When the bypass bleed duct 114 is closed, an aerodynamic phenomenon known as a Helmholtz resonance may be created at the scoop inlet 100. For example, a fluctuating pressure condition may occur at the inlet 102 creating a resonance chamber. In certain embodiments, the resonance may include twenty pounds per square inch peak to peak pressure or more.

Referring still to FIG. 3, a cooling system 110 with a precooler 116 is illustrated according to aspects of the present disclosure. For the depicted embodiment, the precooler 116 is in fluid communication with the bypass bleed duct 114 and the compressor bleed port 125. For example, the precooler 116 may be fluidly coupled to the low pressure compressor bleed port 122 via the low pressure duct 120. Similarly, the precooler 116 may be thermally coupled to the high pressure compressor bleed port 126 via the high pressure duct 124. Further, it should be recognized that the precooler 116 may be in fluid communication with the low pressure compressor bleed port 122, the high pressure compressor bleed port 126, or both via intermediary ducts such as the compressor duct 130. In the exemplary embodiment, the precooler 116 is further in fluid communication with the turbine bleed port 140. For example, the precooler 116 may be fluidly coupled to the turbine bleed port 140 via the turbine duct 138. For the embodiment illustrated, a precooler inlet 146 fluidly couples the shut off valve 136 to the precooler 116. It should be recognized that the precooler 116 may be fluidly coupled to any combination of the low pressure compressor bleed port 122, the high pressure compressor bleed port 126, and the turbine bleed port 140 via the shut off valve 136 and/or the precooler inlet 146.

In the illustrated embodiment, the precooler 116 includes a heat exchanger to thermally couple the bypass bleed air with pressurized air from the precooler inlet 146. For example, the precooler 116 may be a heat exchanger that transfers heat from compressor bleed air supplied by at least one of the compressor bleed ports 125 to the bypass bleed air. Similarly, the precooler 116 may be a heat exchanger that transfers heat from the turbine bleed air supplied by the turbine bleed port 140 to the bypass bleed air. It should be recognized that the pressurized air supplied to the precooler inlet 146 may originate from the low pressure compressor bleed port 122, the high pressure compressor bleed port 126, or the turbine bleed port 140. Further, for the illustrated embodiment, the heat exchanging precooler 116 is disposed between the bypass bleed duct 114 and the precooler inlet 146 to conduct heat from fluid traveling through the precooler inlet 146 to fluid traveling through the bypass bleed duct 114. Moreover, thermal paste or an intermediate circuit having coolant, such as PAO (PolyAlphaOlefins) or other glycolic blends, may be provided between the bypass bleed duct 114 and the precooler inlet 146 to further facilitate the rapid transfer of heat.

Still referring to FIG. 3, the exemplary cooling system 110 includes an auxiliary outlet 148 and an exhaust outlet 150 fluidly coupled to the precooler 116. In the exemplary embodiment, the auxiliary outlet 148 is fluidly coupled to the precooler inlet 146 by the precooler 116. Similarly, for the embodiment shown, the bypass bleed duct 114 is fluidly coupled to the exhaust outlet 150 by the precooler 116. For example, the pressurized air supplied by the precooler inlet 146 may pass through the precooler 116 where energy is extracted in the form of heat. Further, the now cooled, pressurized air in the auxiliary outlet 148 may be used to cool other components of the gas turbine engine 10 and/or for other purposes such as pneumatic power. Further, for the exemplary embodiment, bypass bleed air supplied by the bypass bleed duct 114 passes through the precooler 116 where energy is added in the form of heat. Further, the now heated bypass bleed air may exit the precooler 116 to the exhaust outlet 150. The exhaust outlet 150 may be used to fluidly couple the precooler 116 to at least one of the bypass exhaust 55 or the exhaust nozzle 36 (see e.g., FIGS. 1 and 2). As such, the bypass bleed air may be used to generate additional thrust in the gas turbine engine 10.

It should be recognized that the precooler 116 may hermetically seal the bypass bleed duct 114 from the precooler inlet 146. For example, the precooler 116 may allow the pressurized air in the precooler inlet 146 to be cooled by the precooler 116 while reducing pressure losses in the fluid supplied from the compressor bleed port(s) 125 and/or the turbine bleed port 140.

Further, it should be recognized that the exemplary cooling systems 110 of FIG. 3 is an example only of the cooling systems 110 that may be coupled to and used with the scoop inlet 100. For example, the scoop inlet 100 may be utilized with any capable cooling system 110, air management system, or auxiliary pneumatic system.

Figure 4:
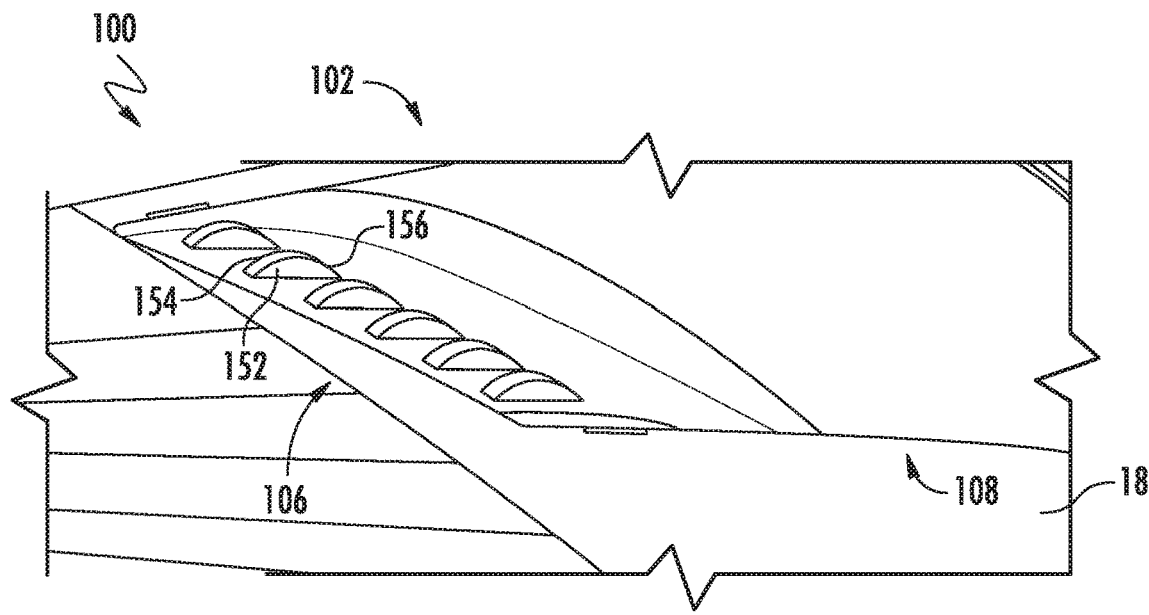
FIG. 4 is a view of an exemplary inlet of a scoop inlet illustrated according to aspects of the present subject matter.
Figure 5:
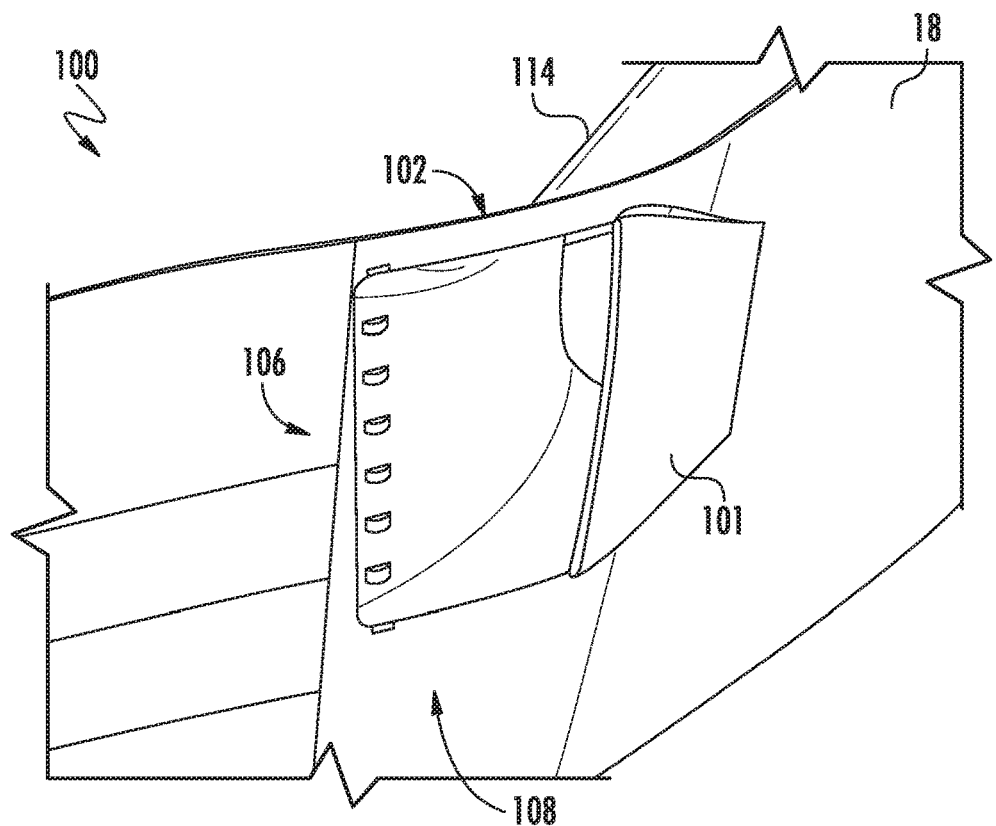
FIG. 5 is another view of the exemplary scoop inlet of FIG. 4 according to aspects of the present disclosure.
Figure 6:
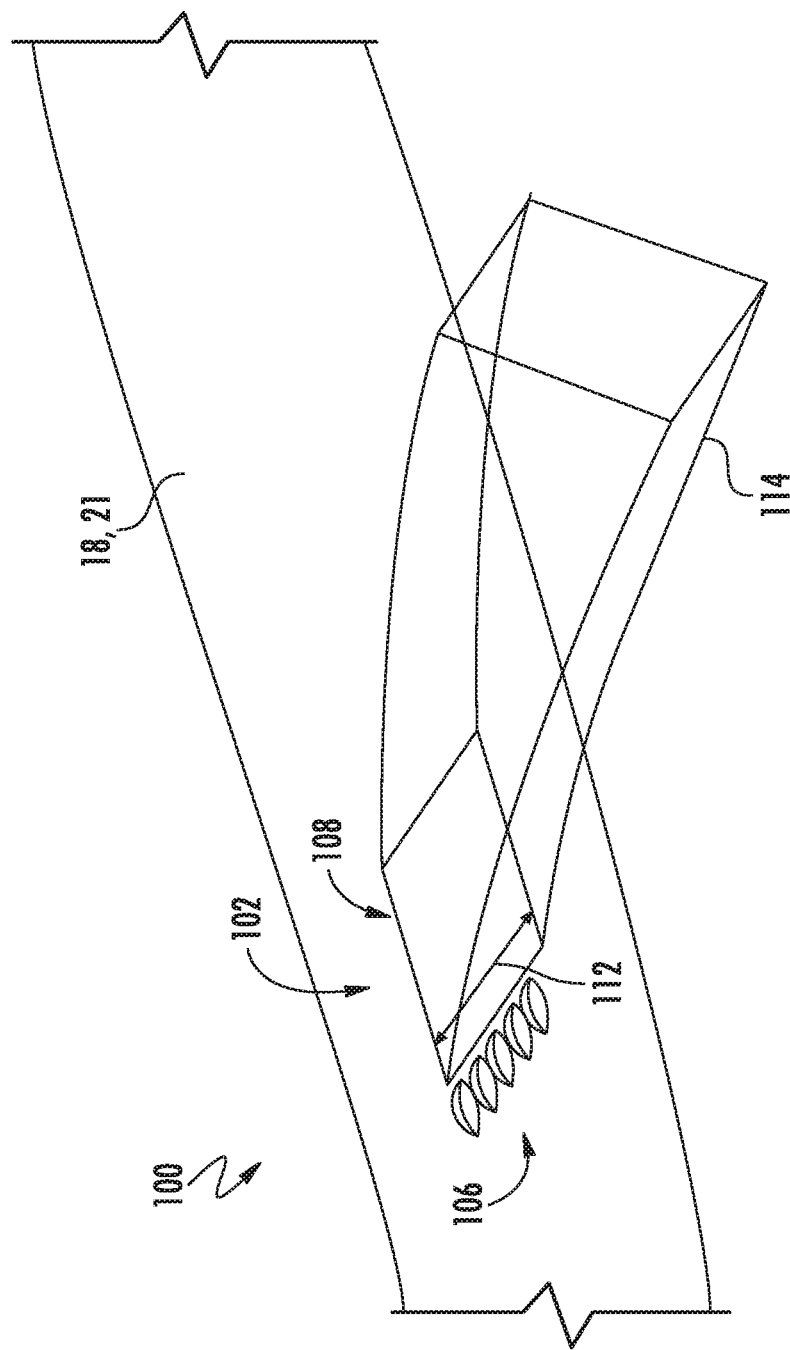
FIG. 6 is a view of another exemplary scoop inlet according to aspects of the present disclosure.
Figure 7:
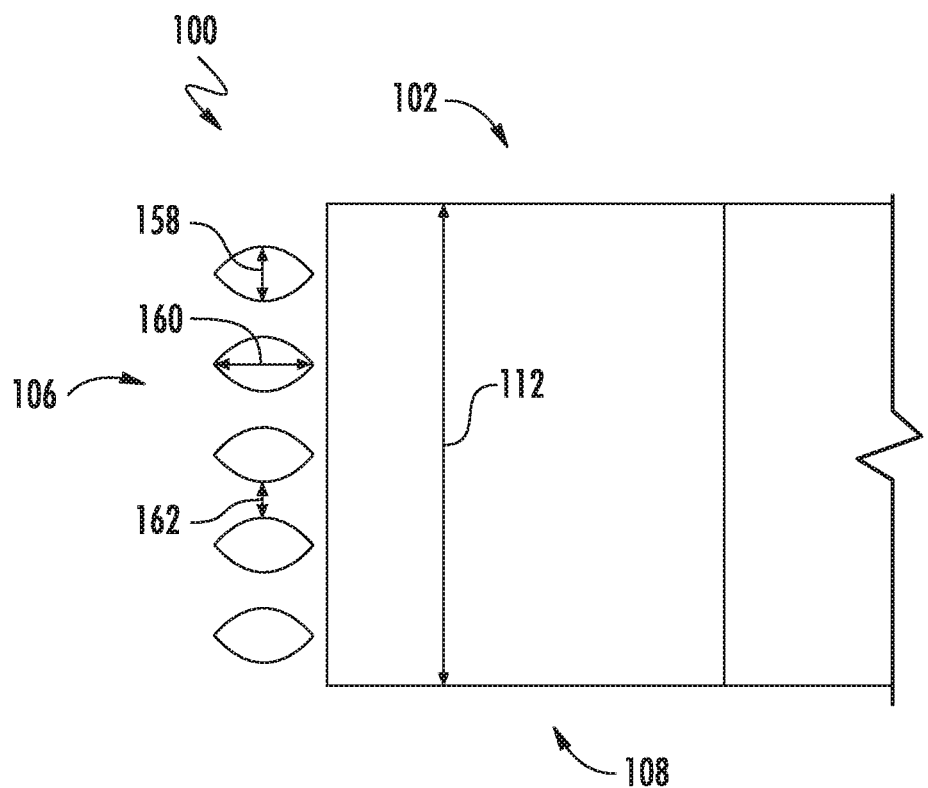
FIG. 7 is a top view of an exemplary inlet of the scoop inlet of FIG. 6 according to aspects of the present disclosure.
Figure 8:
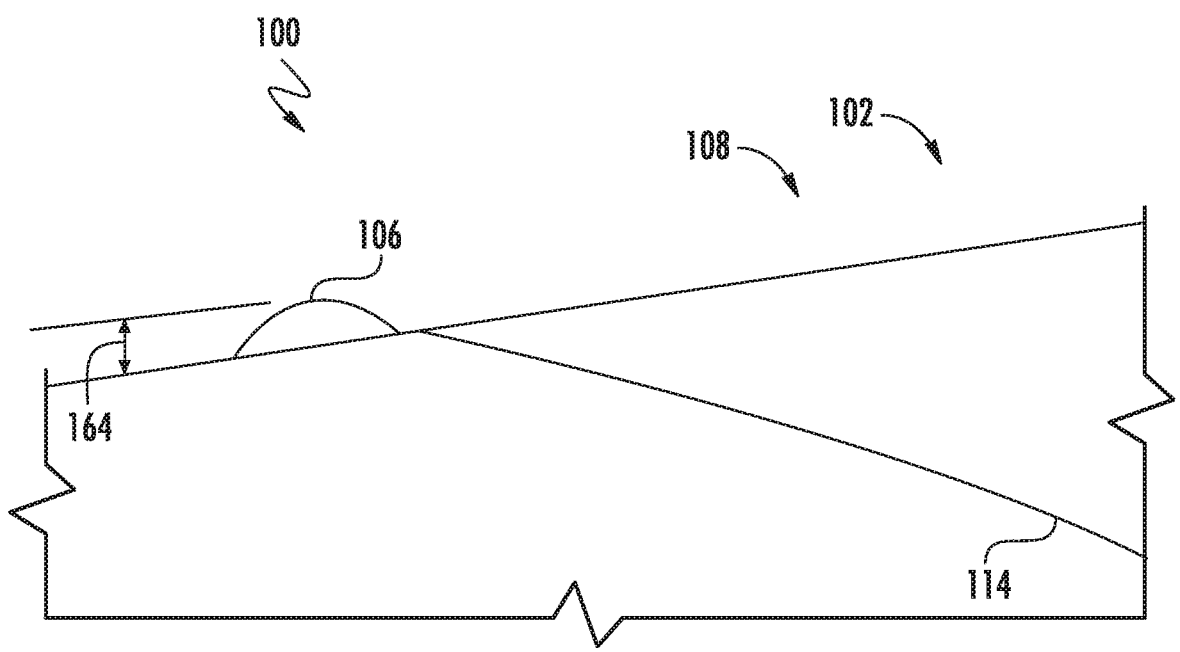
FIG. 8 is a cross-sectional view of the exemplary inlet of FIG. 6 according to aspects of the present disclosure.

Referring now to FIGS. 4-8, multiple views of various embodiments of the scoop inlet 100 that may be utilized in the exemplary gas turbine engine 10 and with the exemplary cooling systems 110 are illustrated according to aspects of the present disclosure. More particularly, FIG. 4 illustrates one view of an exemplary inlet 102 of a scoop inlet 100. FIG. 5 illustrates another view of the exemplary inlet 102 of FIG. 4. FIG. 6 illustrates a view of another exemplary scoop inlet 100. FIG. 7 shows a top view of the exemplary inlet 102 of the scoop inlet 100 of FIG. 6. FIG. 8 shows a cross-sectional view of the inlet 102 of FIGS. 6 and 7. Further, though the exemplary scoop inlets 100 are shown on the core engine casing 18, such as on an exterior surface 19 of the core engine casing 18, the scoop inlet 100 may be located anywhere in the bypass flow passage 48 or the fan section 16 as explained in regards to FIG. 2. For example, the scoop inlet 100 may be positioned at an interior surface 21 of the nacelle 40.

For the illustrated embodiments, the scoop inlet 100 includes the inlet 102 at the core engine casing 18. The inlet 102 may be in fluid communication with a bypass flow passage 48 (see e.g., FIGS. 1 and 2). Further, for the depicted embodiment, the inlet 102 includes a mouth 108 fluidly coupling the bypass flow passage 48 to a cooling system 110 (see. e.g., FIG. 3). For example, the mouth 108 may receive bypass bleed air from the bypass flow passage 48. As seen particularly in FIGS. 6 and 7, the mouth 108 defines a width 112 in a circumferential direction relative the centerline 12 (see e.g., FIGS. 1 and 2). Further, the mouth 108 of the inlet 102 may be flush with the core engine casing 18 such that a minimum disturbance is created in a boundary layer of the bypass flow passage 48 downstream of the scoop inlet 100.

As best seen in the embodiment of FIG. 5, the scoop inlet 100 may include an inlet cowl 101 at a downstream portion or aft portion of the inlet 102 relative to the centerline 12. For the embodiment depicted, the inlet cowl 101 may direct the flow of the bypass fluid into the mouth 108 of the inlet 102 and prevent the bypass fluid from flowing back into the bypass flow passage 48. Further, the inlet cowl 101 may increase the efficiency of the gas turbine engine 10. For example, the inlet cowl 101 may further reduce disturbances to the boundary layer in the bypass flow passage 48 downstream of the scoop inlet 100.

Referring particularly to FIGS. 5 and 6, a bypass bleed duct 114 may fluidly couple the mouth 108 to the cooling system 110, as described in regards to FIG. 3. For the illustrated embodiments, the bypass bleed duct 114 is defined through the core engine casing 18. For example, the bypass bleed duct 114 may be encased by the core engine casing 18 and extend between the inlet 102 and the cooling system 110. Further, in other embodiments, the bypass bleed duct 114 may be defined through the nacelle 40 if the scoop inlet 100 is positioned on an interior surface 21 of the nacelle 40.

Referring now again generally to FIGS. 4-8, for the depicted embodiments, the scoop inlet 100 includes a plurality of droplets 106 at the mouth 108 of the inlet 102. For example, the droplets 106 may be positioned at the leading edge of the inlet 102. For the exemplary embodiments, the droplets 106 at least partially extend into the bypass fluid traveling through the bypass flow passage 48.

For the exemplary embodiments, the droplets 106 have a humped, streamlined profile to trigger small flow eddies above the mouth 108 of the scoop inlet 100. The small flow eddies may break up the resonance chamber at the inlet 102 preventing undesirable vibrations, performance loses, noise, and damage to the hardware. It should be recognized that the droplets 106 may be large enough to introduce a local turbulent flow at the inlet 102, preventing the formation of resonance. Further, the droplets 106 may still be small enough that the local turbulence dissipates downstream of the scoop inlet 100. For example, the flow downstream of the scoop inlet 100 may be substantially laminar. As such, the droplets 106 may have a minimal effect on the boundary conditions of the bypass flow passage 48 downstream of the scoop inlet 100.

Referring now particularly to FIG. 7, for the depicted embodiment, the plurality of droplets 106 defines a droplet width 158, a droplet length 160, and a plurality of droplet spaces 162. For example, the droplet width 158 may be the width of the droplets 106 in the circumferential direction relative to the centerline 12 (see e.g., FIGS. 1 and 2). For the illustrated embodiment, the droplet width 158 is approximately 0.1 to 0.4 of the width 112 of the mouth 108. For the shown embodiment, the droplets 106 define the droplet length 160 in an axial direction relative to the centerline 12. For example, the droplet length 160 may be approximately 0.15 to 0.45 of the width 112 of the mouth 108. In the exemplary embodiment, the droplets 106 define a plurality of droplet spaces 162 extending between the droplets 106 in the circumferential direction. For example, the droplet spaces 162 may be approximately 0.05 to 0.2 of the width 112 of the mouth 108.

Referring now particularly to FIG. 8, the droplets 106 may define a droplet height 164 in a radial direction relative to the centerline 12. In the depicted embodiment, the droplet height 164 may be approximately one to two times the local thickness of a boundary layer of the bypass fluid in the bypass flow passage 48. As such, the droplet height 164 may be the minimum amount necessary to form vortices/eddies in the boundary layer at the scoop inlet 100. It should be recognized that a droplet height 164 greater than necessary may create undesirable turbulent flow downstream of the scoop inlet 100 leading to inefficiencies. Contrarily, if the droplet height 164 is not great enough, the vortices/eddies may not be formed by the droplets 106 or may be too small to reduce and/or eliminate resonance at the mouth 108 of the inlet 102.

It should be recognized that, although the droplets 106 are shown to be uniform in FIGS. 4-8, in other embodiments, the droplets 106 may have different shapes and/or orientations. For example, some droplets 106 may have a first shape, length, width, and spacing between droplets 106 while other droplets 106 have a different shape, length, width, height, and/or spacing.

Figure 9:
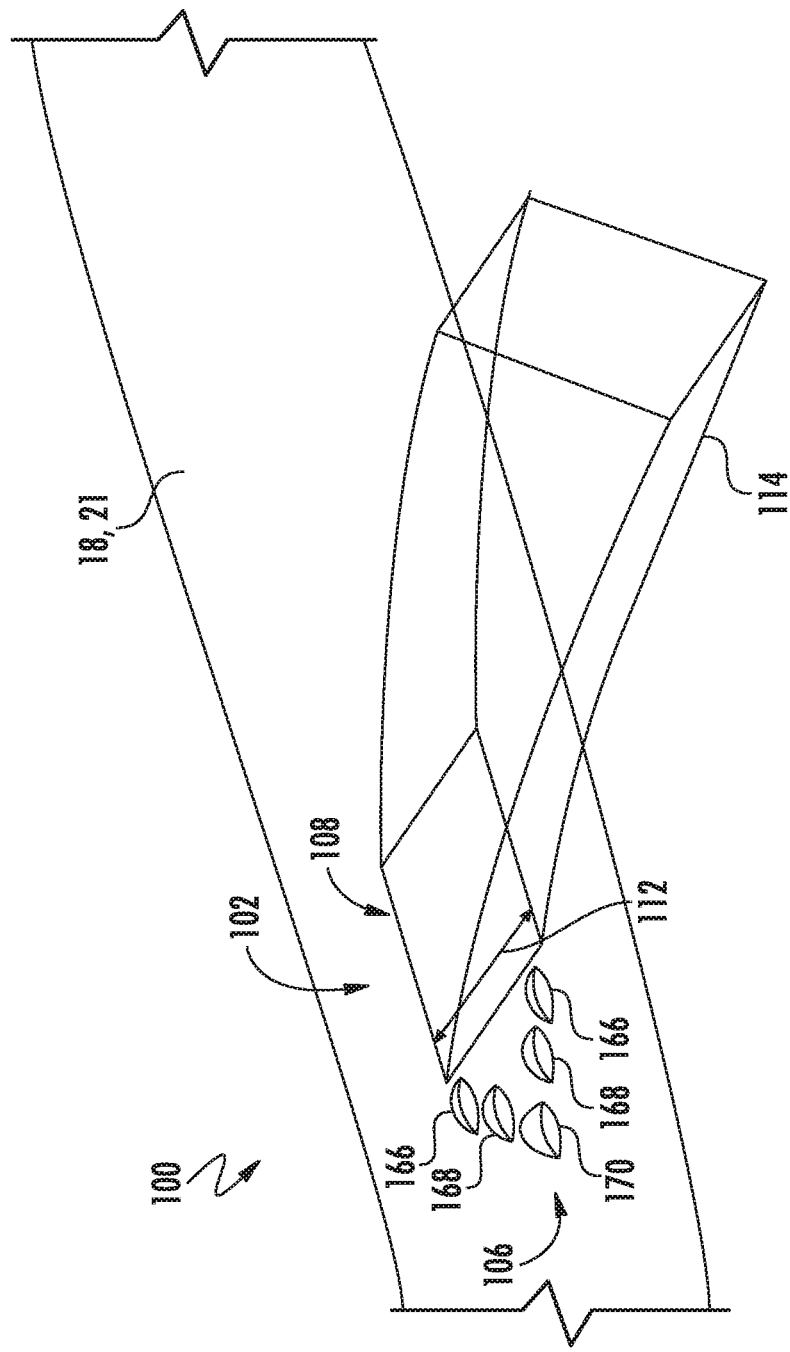
FIG. 9 is a view of another exemplary scoop inlet according to aspects of the present disclosure, particularly illustrating a scoop inlet with droplets of varying height.

Referring particularly to FIG. 9, one embodiment of the scoop inlet 100 is depicted including droplets 106 with variable heights. For instance, the droplets 106 may include one or more first droplets 166 with at a first height. The droplets 106 may also include one or more second droplets 168 with a second height different than the first height. Further, the droplets 106 may include one or more third droplets 170 at a third height different than the first and second heights. In the embodiment illustrated, the second height is greater than the first height, and the third height is greater than the second height. As shown, the height of the droplets 106 may increase as the droplets 106 near the center of mouth 108. Droplets 106 with taller heights near the center of the mouth 108 may introduce larger vortices to travel into the inlet 102. Further, the droplets 106 with shorter heights may be placed near the edges of the mouth 108 to reduce the size of vortices that travel downstream of the scoop inlet 100 into the bypass flow passage 48.

The droplets 106 may have any shape that creates eddies or vortices downstream of the droplets 106. For example, as seen particularly in FIGS. 4 and 5, the droplets 106 may have a bumper shape with approximately flat side sections 152 and a circular top portion 154. Further, for the exemplary embodiment, a sharp corner 156 joins the flat side sections 152 and the circular top portion 154. The sharp corner 156 may help to trigger the small eddies preventing the formation of a resonance chamber. As seen particularly in FIGS. 6-8, the droplets 106 may have an oval shape or egg shape.

Referring particularly to FIG. 10, one embodiment of the scoop inlet 100 is illustrated with circular shaped droplets 106 in accordance with aspects of the present disclosure. As shown, the droplets 106 may have a circular cross-section, such as a half-circle cross-section. For example, the droplet length 160 may be approximately the same as the droplet width 158. Referring now particularly to FIG. 11, another embodiment of the scoop inlet 100 is illustrated with droplets 106 including a tab shaped cross-section in accordance with aspects of the present disclosure. As illustrated, the droplets 106 may have a tab shape such as a rectangular shape. Further, in the embodiment shown, the droplets 106 may have an approximately square shape. For example, the droplet length 160 may be approximately the same as the droplet width 158. In additional embodiments, the droplet height 164 may also be approximately the same as the droplet length 160 and droplet width 158 such that the tab shaped droplet 106 is approximately a cube.

It should be recognized that the droplets 106 may have nearly any other shape and/or cross-section that creates an interruption in the local laminar flow corresponding to eddy/vortex formation. For example, in certain embodiments, the droplets 106 may have a circular, square, rectangular, or other polygonal shape.

Still referring generally to FIGS. 4-8, for the illustrated embodiments, the droplets 106 may be arranged approximately in a row in the circumferential direction relative to the centerline 12. In certain embodiments, the row of droplets 106 includes at least two droplets 106 but less than eight droplets 106. As seen particularly in FIGS. 6 and 7, the plurality of droplets 106 may be five droplets 106. For example, in the depicted embodiment of FIGS. 6 and 7, five droplets 106 are arranged in a row at the mouth 108 of the inlet 102 in the circumferential direction.

In other embodiments, a plurality of rows may contain a plurality of droplets 106. Referring now particularly to FIG. 10, one embodiment of the scoop inlet 100 is illustrated with two rows of droplets 106. In the embodiment depicted, the droplets 106 may be staggered from each other such that droplets 106 of a first row 172 are positioned upstream of the droplet spaces 162 between the droplets 106 of a second row 174. Referring now to FIG. 12, one embodiment of the scoop inlet 100 is illustrated with a plurality of rows of droplets 106 according to the present disclosure. Particularly, FIG. 12 illustrates a plurality of droplets 106 where rows of droplets 106 closer to the mouth 108 include more droplets 106 than rows farther upstream of the mouth 108. Further, the droplets 106 may be concentrated near the center of the mouth 108. As such, the droplets 106 may introduce more turbulent flow near the center of the mouth 108 and less turbulent flow near the edges of the mouth 108. Further, such an arrangement of the droplets 106 may introduce larger vortices to travel into the inlet 102 while minimizing the size of vortices that travel downstream of the scoop inlet 100 into the bypass flow passage 48.

In other embodiment, the droplets 106 may not be organized into rows. Referring again to FIG. 9, the scoop inlet 100 is illustrated where the droplets 106 are arranged in a semi-circular shape around the mouth 108. It should be recognized that the droplets 106 may be organized in any grid, array, or arrangement that creates an interruption in the local laminar flow corresponding to eddy/vortex formation.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A scoop inlet for a turbomachine, wherein the turbomachine has a core engine casing relative to a centerline extending a length of the turbomachine, and wherein the core engine casing at least partially defines a bypass flow passage, the scoop inlet comprising:
- an inlet at the core engine casing in fluid communication with the bypass flow passage, the inlet comprising a mouth fluidly coupling the bypass flow passage to a cooling system, wherein the mouth receives bypass bleed air from the bypass flow passage, and wherein the mouth defines a width in a circumferential direction relative to the centerline;
- a bypass bleed duct defined through the core engine casing, wherein the bypass bleed duct fluidly couples the mouth to the cooling system; and
- a plurality of droplets at the mouth of the inlet,
- wherein each of the plurality of droplets is continuously curved from a leading edge thereof to a trailing edge thereof within a plane perpendicular to the circumferential direction,
- wherein the plurality of droplets at least partially extend from the mouth into the bypass flow passage, and
- wherein the plurality of droplets are separate and spaced apart from each other in the circumferential direction.

2. The scoop inlet of claim 1, wherein the plurality of droplets define a droplet width approximately 0.1 to 0.4 of the width of the mouth.

3. The scoop inlet of claim 1, wherein the plurality of droplets define a length in an axial direction relative to the centerline, and wherein the length is approximately 0.15 to 0.45 of the width of the mouth.

4. The scoop inlet of claim 1, wherein the plurality of droplets are arranged approximately in a row in the circumferential direction.

5. The scoop inlet of claim 4, wherein the plurality of droplets define a plurality of spaces extending between the plurality of droplets in the circumferential direction, and wherein the spaces are approximately 0.05 to 0.2 of the width of the mouth.

6. The scoop inlet of claim 1, wherein a height of the plurality of droplets in a radial direction relative to the centerline is approximately 1 to 2 times a local thickness of a boundary layer of a bypass fluid traveling through the bypass flow passage.

7. The scoop inlet of claim 1, further comprising a fan air valve in fluid communication with the bypass bleed duct, wherein the fan air valve selectively allows fluid communication between the bypass bleed duct and the cooling system.

8. The scoop inlet of claim 1, wherein the plurality of droplets comprises five droplets arranged in a row at the mouth in the circumferential direction.

9. The scoop inlet of claim 1, wherein the plurality of droplets comprises at least two droplets but less than eight droplets.

10. The scoop inlet of claim 1, wherein the inlet is positioned at a fan section of the turbomachine.

11. The scoop inlet of claim 1,
- wherein each of the plurality of droplets defines a length in an axial direction relative to the centerline that is greater than a width thereof in the circumferential direction, and
- wherein the width of each of the plurality of droplets is greater than a space between adjacent droplets of the plurality of droplets in the circumferential direction.

12. A turbomachine defining a centerline extending a length of the turbomachine, the turbomachine comprising:
- a nacelle extending the length of the turbomachine relative to the centerline, wherein the nacelle at least partially defines a bypass flow passage;
- a core engine including a core engine casing positioned interior to the nacelle in a radial direction relative to the centerline, wherein the core engine casing at least partially defines the bypass flow passage;
- a cooling system positioned at least partially interior to the core engine casing relative to the radial direction; and
- a scoop inlet in fluid communication with the bypass flow passage, the scoop inlet comprising:
  - an inlet at the core engine casing or an interior surface of the nacelle in fluid communication with the bypass flow passage, the inlet comprising a mouth fluidly coupling the bypass flow passage to the cooling system, wherein the mouth receives bypass bleed air from the bypass flow passage, and wherein the mouth defines a width in a circumferential direction relative to the centerline;
  - a bypass bleed duct defined through at least one of the core engine casing or the nacelle, wherein the bypass bleed duct fluidly couples the mouth to the cooling system; and
  - a plurality of droplets at the mouth of the inlet,
  - wherein each of the plurality of droplets is continuously curved from a leading edge thereof to a trailing edge thereof within a plane perpendicular to the circumferential direction,
  - wherein the plurality of droplets at least partially extend from the mouth into the bypass flow passage, and
  - wherein the plurality of droplets are separate and spaced apart from each other in the circumferential direction.

13. The turbomachine of claim 12, wherein the scoop inlet further comprises a fan air valve in fluid communication with the bypass bleed duct, wherein the fan air valve selectively allows fluid communication between the bypass bleed duct and the cooling system.

14. The turbomachine of claim 12, wherein the cooling system is in fluid communication with a turbine bleed port.

15. The turbomachine of claim 14, wherein the cooling system comprises a precooler in fluid communication with the bypass bleed duct and the turbine bleed port, wherein the precooler includes a heat exchanger to thermally couple the bypass bleed air with a turbine bleed air supplied by the turbine bleed port.

16. The turbomachine of claim 12, wherein the cooling system is in fluid communication with a compressor bleed port.

17. The turbomachine of claim 16, wherein the cooling system comprises a precooler in fluid communication with the bypass bleed duct and the compressor bleed port, wherein the precooler includes a heat exchanger to thermally couple the bypass bleed air with a compressor bleed air supplied by the compressor bleed port.

18. The turbomachine of claim 12, wherein the cooling system is in fluid communication with a compressor bleed port and a turbine bleed port, wherein the cooling system comprises a precooler in fluid communication with the bypass bleed duct, the compressor bleed port, and the turbine bleed port, and wherein the precooler includes a heat exchanger to thermally couple the bypass bleed air with at least one of a turbine bleed air supplied by the turbine bleed port or a compressor bleed air supplied by the compressor bleed port.

19. The scoop inlet of claim 12, wherein the inlet is positioned at the core engine casing.

20. The turbomachine of claim 12, wherein the inlet is positioned at the interior surface of the nacelle.

21. The turbomachine of claim 12,
wherein each of the plurality of droplets defines a length in an axial direction relative to the centerline that is greater than a width thereof in the circumferential direction, and
wherein the width of each of the plurality of droplets is greater than a space between adjacent droplets of the plurality of droplets in the circumferential direction.

22. A scoop inlet for a turbomachine, wherein the turbomachine has a nacelle relative to a centerline extending a length of the turbomachine, and wherein the nacelle at least partially defines a bypass flow passage, the scoop inlet comprising:
an inlet at the nacelle in fluid communication with the bypass flow passage, the inlet comprising a mouth fluidly coupling the bypass flow passage to a cooling system, wherein the mouth receives bypass bleed air from the bypass flow passage, and wherein the mouth defines a width in a circumferential direction relative to the centerline;
a bypass bleed duct defined through the nacelle, wherein the bypass bleed duct fluidly couples the mouth to the cooling system; and
a plurality of droplets at the mouth of the inlet,
wherein each of the plurality of droplets is continuously curved from a leading edge thereof to a trailing edge thereof within a plane perpendicular to the circumferential direction,
wherein the plurality of droplets at least partially extend from the mouth into the bypass flow passage, and
wherein the plurality of droplets are separate and spaced apart from each other in the circumferential direction.

23. The scoop inlet of claim 22,
wherein each of the plurality of droplets defines a length in an axial direction relative to the centerline that is greater than a width thereof in the circumferential direction, and
wherein the width of each of the plurality of droplets is greater than a space between adjacent droplets of the plurality of droplets in the circumferential direction.

\* \* \* \* \*